US008717718B2

(12) United States Patent
Kamor et al.

(10) Patent No.: US 8,717,718 B2
(45) Date of Patent: May 6, 2014

(54) ELECTRICAL LOAD CONTROL WITH FAULT PROTECTION

(75) Inventors: Michael Kamor, North Massapequa, NY (US); Adam Kevelos, Coram, NY (US)

(73) Assignee: Leviton Manufacturing Company, Inc., Melville, NY (US)

( * ) Notice: Subject to any disclaimer, the term of this patent is extended or adjusted under 35 U.S.C. 154(b) by 313 days.

(21) Appl. No.: 13/083,786

(22) Filed: Apr. 11, 2011

(65) Prior Publication Data

US 2012/0257316 A1 Oct. 11, 2012

(51) Int. Cl.
*H02H 3/00* (2006.01)
*H02H 9/08* (2006.01)

(52) U.S. Cl.
USPC .................. 361/42; 361/43; 361/44; 361/45; 361/46; 361/47; 361/48; 361/49

(58) Field of Classification Search
USPC ..................................................... 361/42–49
See application file for complete search history.

(56) References Cited

U.S. PATENT DOCUMENTS

| | | | |
|---|---|---|---|
| 4,595,894 A | 6/1986 | Doyle et al. | |
| D306,852 S | 3/1990 | Burkhardt | |
| 5,568,344 A | 10/1996 | Gernhardt et al. | |
| 5,570,778 A | 11/1996 | Gernhardt et al. | |
| 5,917,686 A | 6/1999 | Chan et al. | |
| 5,950,812 A | 9/1999 | Tanacan et al. | |
| 5,963,406 A | 10/1999 | Neiger et al. | |
| 6,040,967 A | 3/2000 | DiSalvo | |
| 6,392,513 B1 * | 5/2002 | Whipple et al. | 335/18 |
| 6,437,700 B1 | 8/2002 | Herzfeld et al. | |
| 6,724,591 B2 | 4/2004 | Clarey et al. | |
| 7,003,435 B2 | 2/2006 | Kolker et al. | |
| 7,161,780 B2 | 1/2007 | Germain et al. | |
| 7,414,499 B2 | 8/2008 | Germain | |
| 7,436,639 B2 | 10/2008 | Power et al. | |

(Continued)

FOREIGN PATENT DOCUMENTS

| | | |
|---|---|---|
| JP | 2000048703 | 2/2000 |
| WO | WO 2009/097469 A1 | 8/2009 |
| WO | WO 2010/005987 A2 | 1/2010 |

OTHER PUBLICATIONS

Leviton Manufacturing Co., Inc., Leviton GFCI Product Brochure (2003).

(Continued)

*Primary Examiner* — Dharti Patel

(74) *Attorney, Agent, or Firm* — Claudio Buttitta, Esq.; Kevin P. Radigan, Esq.; Heslin Rothenberg Farley & Mesiti, P.C.

(57) ABSTRACT

Electrical load controls are provided which include an electrical switch assembly and a fault protection device within a common housing. The switch assembly includes an actuator, and is responsive to actuation of the actuator to switch ON or OFF electricity to the load. The protection device automatically responds to a fault condition by overriding the switch assembly by automatically blocking electrical connection between phase input and output terminals and neutral input and output terminals of the load control. The actuator includes a single external interface element. In one embodiment, actuation of the actuator switches ON or OFF electricity via control of the fault protection device, and in another embodiment, movement of the interface away from the housing exposes within the housing an internal user interface for the fault protection device.

16 Claims, 10 Drawing Sheets

(56) References Cited

U.S. PATENT DOCUMENTS

| | | | | |
|---|---|---|---|---|
| 7,463,124 | B2 | 12/2008 | DiSalvo et al. | |
| 7,535,234 | B2 | 5/2009 | Mernyk et al. | |
| 7,612,973 | B2 | 11/2009 | Germain | |
| 2003/0107854 | A1* | 6/2003 | Mason et al. | 361/42 |
| 2005/0275981 | A1 | 12/2005 | Power et al. | |
| 2006/0158799 | A1* | 7/2006 | Chan et al. | 361/42 |
| 2008/0109193 | A1* | 5/2008 | Lewinski et al. | 703/4 |
| 2009/0180261 | A1 | 7/2009 | Angelides et al. | |
| 2010/0073002 | A1 | 3/2010 | Chan et al. | |
| 2010/0134932 | A1 | 6/2010 | Campolo et al. | |
| 2010/0149711 | A1 | 6/2010 | Larson et al. | |
| 2010/0259347 | A1 | 10/2010 | Ziegler et al. | |

OTHER PUBLICATIONS

Leviton Manufacturing Co., Inc., "Installing and Testing a GFCI Receptacle", Leviton Product Information Leaflet (Jan. 2, 2008).

Leviton Manufacturing Co., Inc., Product Specification No. T7299-T, "15A-25V, Tamper Resistant, Smart Lock Pro Combination GFCI", http://www.leviton.com/OA_HTML/ibeCCtpltmDspRte.jsp?item=467283&section=33616 . . . (downloaded Apr. 11, 2011).

* cited by examiner

ELECTRICAL LOAD CONTROL WITH FAULT PROTECTION

BACKGROUND

The present invention relates generally to electrical load controls, such as standard switches, as well as to fault protection devices, such as ground fault circuit interrupting (GFCI) devices, and arc fault circuit interrupting (AFCI) devices.

The electrical wiring device industry continues to witness an increasing call for fault-interrupting devices designed to interrupt power to various loads, such as household appliances, consumer electrical products and branch circuits. For example, electrical codes currently require electrical circuits in home bathrooms and kitchens, as well as exterior circuits, to be equipped with ground fault circuit interrupters. These electrical codes are often met using GFCI receptacle-type devices, such as those described in commonly owned U.S. Pat. Nos. 6,040,967 and 7,463,124, the entirety of each of which is hereby incorporated herein by reference.

GFCI or AFCI receptacle-type devices are used to protect against electrical shock due to ground fault conditions or arcing conditions, respectively. A GFCI device is basically a differential current detector operative to trip a contact mechanism when a certain amount of unbalanced current is detected between the phase wire and neutral wire of an alternating current (AC) electrical power line. A typical GFCI device includes electrical components such as transformers, a relay and circuitry for detecting a ground fault condition. A typical AFCI device includes a protection component that is used to detect arcs and whose output is used to trigger a circuit-interrupting mechanism in a similar manner to a GFCI device.

More particularly, available GFCI devices, such as the devices described in the above-incorporated patents, as well as in commonly owned, U.S. Pat. No. 4,595,894 (the entirety of which is hereby incorporated herein by reference), use an electrically-activated trip mechanism to mechanically break an electrical connection between the line side and the load side of the wiring device. Such devices are resettable after they are tripped by, for example, the detection of a ground fault. In the device discussed in U.S. Pat. No. 4,595,894, the trip mechanism used to cause the mechanical breaking of the circuit (i.e., the conductive path between the line and load sides) includes a solenoid or trip coil. A TEST button is used to test the trip mechanism, as well as the circuitry used to sense faults, and a RESET button is used to reset the electrical connection between the line and load sides.

AFCI devices, such as the devices described in commonly owned, U.S. Pat. Nos. 7,003,435 and 7,535,234 (the entirety of each of which is hereby incorporated herein by reference), may be stand-alone devices, or used in combination with other circuit interrupting devices, such as GFCI devices. AFCI devices protect against potentially dangerous arc fault conditions. An AFCI fault detector monitors for the presence of arcing, and upon detection of arcing, generates an output signal to activate a circuit-interrupting mechanism to switch open, for example, a phase line and a neutral line coupled to the circuit-interrupting mechanism of the AFCI device.

BRIEF SUMMARY

As a product line enhancement for the electrical wiring device industry, it is desirable to provide additional forms for fault protection devices. In particular, electrical load controls are disclosed herein which have integrated therein fault protection, such as GFCI or AFCI fault protection. These electrical load controls may be used in a wide variety of potential applications, for example, in the place of a conventional switch.

More specifically, in one aspect, an electrical load control is provided which includes a housing, a phase conductive path, a neutral conductive path, an electrical switch assembly, and a fault protection device. The housing has an exposed surface, which is sized and configured to fit within a device opening of a decorative wallplate. The housing does not include a receptacle socket for receiving one or more blades of a plug. The phase conductive path includes a phase input terminal and a phase output terminal, and the neutral conductive path includes a neutral input terminal and a neutral output terminal. Each of the phase and neutral conductive paths are at least partially disposed within the housing, and the phase and neutral conductive paths are arranged and configured to connect a source of electricity, connected to the phase and neutral input terminals, to a load connected to the output phase and neutral terminals. The electrical switch assembly is selectively operable, and is disposed at least partially within the housing. The electrical switch assembly includes a user-accessible actuator, and is arranged and configured to selectively interrupt at least one of the phase or neutral conductive paths to control connection of the source of electricity to the load responsive to actuation of the user-accessible actuator. The fault protection device is disposed at least partially within the housing, and is adapted and configured to control operation of the electrical switch assembly in response to a predetermined fault condition. Actuation of the user-accessible actuator operatively controls connection of the source of electricity to the load via control of the fault protection device by selectively inducing a simulated fault in the fault protection device, and at least a portion of the user-accessible actuator extends beyond the housing and is sized and configured to occupy a substantial portion of the device opening of the decorative wallplate.

In a further aspect, an electrical load control is provided which includes a housing, a phase conductive path, a neutral conductive path, an electrical switch assembly, and a fault protection device. The housing does not include a receptacle socket for receiving one or more blades of a plug. The phase conductive path has a phase input terminal and a phase output terminal, and the neutral conductive path has a neutral input terminal and a neutral output terminal. Each of the phase and neutral conductive paths is at least partially disposed within the housing, and the phase and neutral conductive paths are arranged and configured to connect a source of electricity, connected to the phase and neutral input terminals, to a load connected to the phase and neutral output terminals. The electrical switch assembly is disposed at least partially within the housing, and includes a user-accessible actuator. The switch assembly is arranged and configured to selectively interrupt at least one of the phase or neutral conductive paths to control connection of the source electricity to the load responsive to actuation of the user-accessible actuator. The fault protection device is disposed at least partially within the housing, and is adapted and configured to control operation of the electrical switch assembly in response to a predetermined fault condition. The user-accessible actuator is coupled to the housing and configured for movement away from the housing to expose an internal user interface of the fault protection device. The internal user interface includes a TEST button and a RESET button, which facilitate user interaction with the fault protection device.

Additional features and advantages are realized through the concepts of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Disclosed herein are various electrical load controls, comprising a housing, an electrical switch assembly, a fault protection device, and an external user interface. In one embodiment, the external user interface includes a single interface element which, in accordance with an aspect of the present invention, is part of and controls the electrical switch assembly. Advantageously, the external user interface may be configured with the appearance of any conventional switch, notwithstanding presence of the fault protection device within the housing. This is accomplished, in a first embodiment, by coupling the electrical switch assembly to the fault protection device so that actuation of the actuator of the electrical switch assembly switches ON or OFF electricity to the load via control of the fault protection device. In a second embodiment, this is accomplished by movably or removably coupling the external user interface to the housing, wherein movement of the external user interface away from the housing exposes an internal user interface for the fault protection device. This internal user interface includes a TEST button and a RESET button, which facilitate user interaction with the fault protection device.

Figure 1:
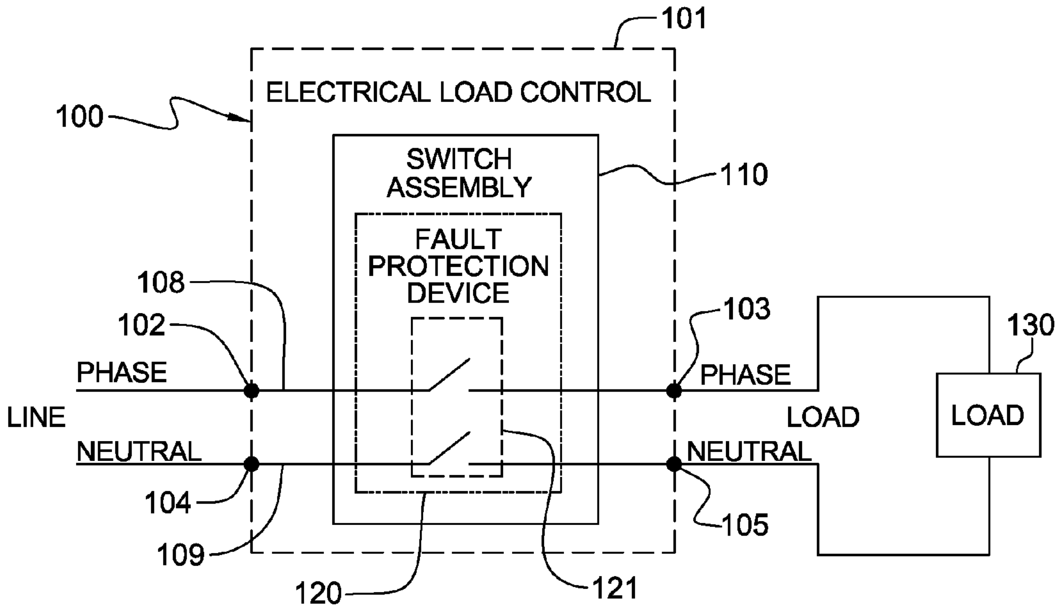
FIG. 1 is a circuit diagram of one embodiment of an electrical load control, in accordance with one or more aspects of the present invention.

FIG. 1 depicts one example of a circuit diagram for an electrical load control implementing the first embodiment, wherein the switch assembly is coupled to the fault protection device, and actuation of the actuator of the switch assembly switches ON or OFF electricity to the load via control of the fault protection device. FIG. 5 depicts one example of a circuit diagram for an electrical load control implementing the second embodiment, wherein the external user interface is movably or removably coupled to the housing, so that movement of the external user interface away from the housing exposes an internal user interface for the fault protection device. By way of example only, FIGS. 2-4B present one physical implementation of the electrical load control illustrated in FIG. 1, and FIGS. 6A-8B illustrate one physical implementation of the electrical load control illustrated in FIG. 5.

Note that in the implementations depicted and described herein, the fault protection device is a GFCI device, which is presented again by way of example only. Alternatively, the electrical load control could be implemented with an AFCI device as the fault protection device, or alternatively, as a combined GFCI/AFCI device, or in fact any other suitable device such as an ALCI, ELCI, circuit breaker, or combination thereof. The combination GFCI/AFCI device can be realized by the addition of arc detection circuitry to a standard GFCI. Such a device is a combination ground fault and arc fault detector, which has the ability to interrupt a circuit, and thereby prevent both dangerous ground fault and arcing conditions from harming personnel or property. More particularly, the circuitry for the AFCI controller can be placed on its own electronic control board, or on the electronic control board typically used in today's GFCI device. When a single electronic control board is used for both arc detection and ground fault protection, it can be powered from the same power source that is used to provide power to the GFCI, and, in addition, other components of the GFCI, such as the mechanism for interrupting the flow of current to the load when a fault occurs, may be employed. Further details on AFCI devices and combined GFCI/AFCI devices are provided in the above-incorporated, commonly owned, U.S. Pat. Nos. 7,003,435 and 7,535,234.

As noted, FIG. 1 depicts one embodiment of an electrical load control, generally denoted 100, in accordance with an aspect of the present invention. Electrical load control 100 includes a housing 101 with a set of input terminals, comprising phase input terminal 102 and neutral input terminal 104, associated with the housing and shown electrically connected to a source of electricity via a phase line conductor and a neutral line conductor, respectively. The electrical load control further includes a set of output terminals, comprising phase output terminal 103 and neutral output terminal 105, associated with the housing and shown electrically connected to one or more loads 130 via a phase load conductor and a neutral load conductor, respectively. The load is connected to the source of electricity when phase and neutral input terminals 102,104 are electrically connected to phase and neutral output terminals 103,105 through phase and neutral conductive paths 108,109, respectively. Electricity may be selectively provided to load 130 by selectively connecting (e.g., selectively interrupting) one or both of the phase and neutral conductive paths 108,109. Note that, as used herein, the input resides on the line side of the electrical load control, and the output resides on the load side of the electrical load control. Note also that the input and output terminal sets, associated with the housing permit wiring external to the housing to be connected to the electrical load control, and may be, for example, any suitable electrical fastening devices that secure or connect external conductors to the electrical load control, as well as conduct electricity. Examples of such connections, or terminals, include binding screws, set screws, pressure clamps, pressure plates, push-in-type connections, pigtails and quick connect tabs, etc.

Figure 2:
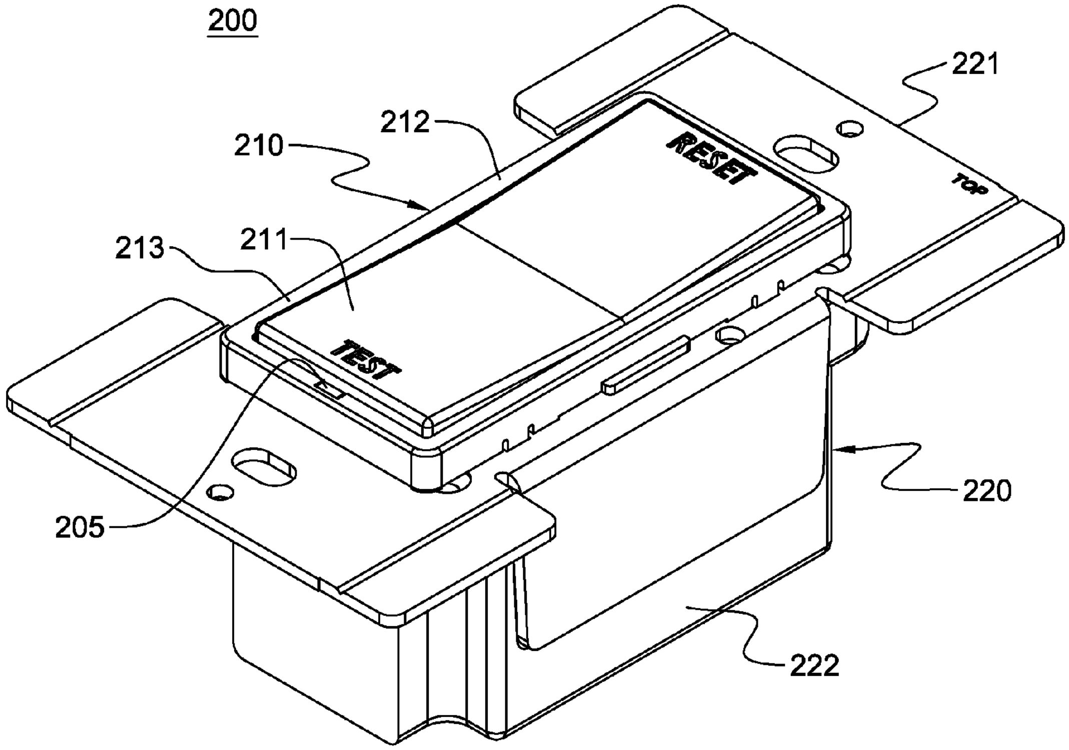
FIG. 2 is a perspective view of one embodiment of the electrical load control of FIG. 1, in accordance with one or more aspects of the present invention.

An electrical switch assembly 110 is disposed at least partially within housing 101, and includes an actuator (see, e.g., actuator 211 of the electrical load control 200 of FIG. 2). Electrical switch assembly 110 is responsive to actuation of the actuator to switch ON or OFF electricity to load 130. A fault protection device 120 is also disposed at least partially within housing 101 and is electrically coupled to electrical switch assembly 110. Fault protection device 120 responds to a predetermined fault condition by automatically overriding the electrical switch assembly 110 by automatically blocking/interrupting electrical connection between one or more of the phase input terminal 102 and the phase output terminal 103, or the neutral input terminal 104 and the neutral output terminal 105; e.g., by interrupting one or more of the phase and neutral conductive paths 108, 109. This is accomplished, in one embodiment, via actuation of a relay 121 of fault detection device 120.

In one embodiment, relay 121 is a double-pole, single-throw (DPST) relay mechanism that, when opened, operates to block or interrupt electrical connection between the phase input and output terminals 102, 103, and between the neutral input and output terminals 104, 105. It should be noted that relay 121 may be of any suitable construction such as an off-the-shelf commercial relay or simply a plurality of contacts capable of being closed and opened. Alternatively, relay 121 may take the form of any suitable switching device such as but not limited to a thyristor, silicon-controlled rectifier (SCR), triac, transistor, MOSFET, Power MOSFET, or the like. Additionally, relay 121 may take the form of any suitable combination of these components. Of course it should be appreciated that, as indicated above, the load may be disconnected from the source of electricity by interrupting either of the phase or neutral conductive paths and in such an embodiment, a single-pole, single-throw (SPST) relay mechanism may be used to interrupt either the phase or neutral conductive paths. Still further, two separate relay mechanism may be employed to separately interrupt the phase and/or neutral conductive paths.

In the illustrated implementation, electrical switch assembly 110 is coupled to fault protection device 120 so that actuation of the actuator of electrical switch assembly 110 switches ON or OFF electricity to the load via control of fault protection device 120; for example, by (at least in part) controlling relay 121 of fault protection device 120 to establish electrical connection between one or more of the phase input and output terminals 102, 103 or the neutral input and output terminals 104, 105, or to interrupt electrical connection between one or more of the phase input and output terminals 102, 103 or the neutral input and output terminals 104, 105; i.e., selectively interrupting one or more of the phase and neutral conductive paths 108, 109. By way of specific example, actuation of the actuator of the electrical switch assembly 110 may switch ON electricity to the load by generating a reset of the fault protection device 120, for example, a RESET of a GFCI (in the case where the fault protection device is a GFCI device), and actuation of the actuator may switch OFF electricity to the load by inducing a TEST fault in the fault protection device 120, resulting in the fault protection device interrupting via relay 121 electrical connection between one or more of the phase input and output terminals and the neutral input and output terminals; i.e., selectively interrupting one or more of the phase and neutral conductive paths. It should be understood by those skilled in the art that inducing a TEST fault may include creating a simulated fault in the fault protection device (e.g., introducing a signal on one or more fault sensors comprising the fault protection device) as well as creating an actual fault in the fault protection device (e.g., shorting phase to ground). Whether a simulated fault or an actual fault is utilized, the fault protection device senses/interprets such induced TEST fault and treats it as being equivalent to the predetermined fault condition for which it is designed and configured to be responsive.

FIG. 2 is a perspective view of an electrical load control, generally denoted 200, implementing the load control circuit embodiment described above in connection with FIG. 1. In FIG. 2, an external user interface 210 is provided, which is coupled to a housing 220. By way of example, housing 220 includes an upper housing component 221 with a mounting yoke, and a lower housing component 222, both of which may be fabricated of a plastic material. In one aspect, external user interface 210 is coupled to housing 220 in a manner which facilitates ready removal of external user interface 210 from housing 220, for example, to substitute one external user interface for another external user interface of different appearance, such as a different color.

Figure 9A:
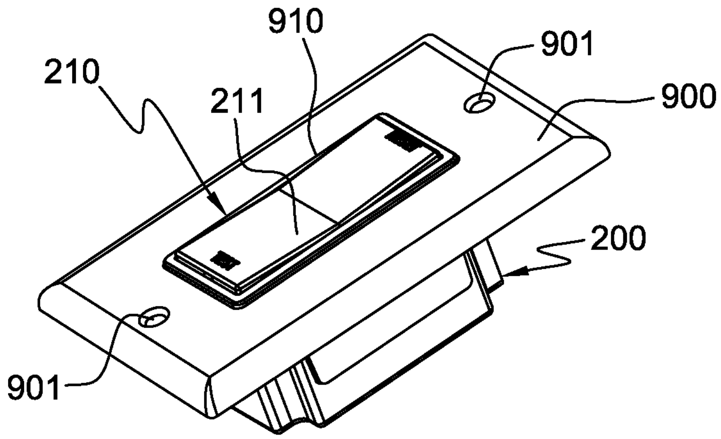
FIG. 9A depicts the electrical load control of FIG. 2 and a wallplate comprising an appropriately-sized decorator-style opening accommodating the external user interface raised therein, in accordance with an aspect of the present invention.
Figure 9B:
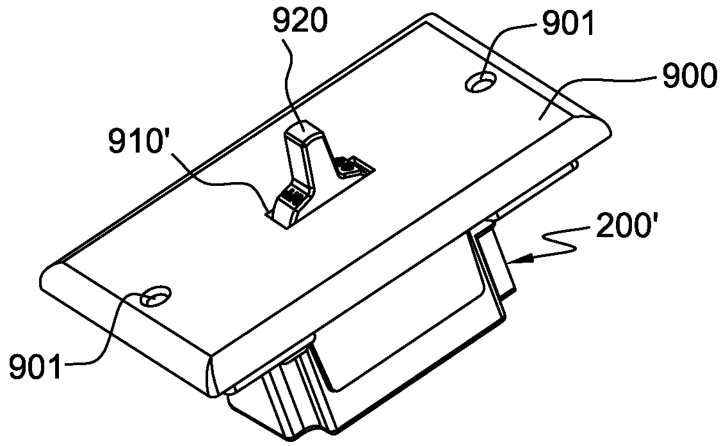
FIG. 9B is an alternate embodiment of the electrical load control of FIG. 2, wherein the rocker-type actuator of FIG. 9A is replaced with a toggle-type actuator, and illustrating the electrical load control with a wallplate having an opening configured to accommodate the toggle-type actuator, in accordance with an aspect of the present invention.

External user interface 210, which includes an exposed surface 213 of housing 220, advantageously presents to a user a single interface element, which is, in one embodiment, an actuator 211 of the electrical switch assembly 110, described above in connection with FIG. 1. As used herein, a “single interface element” refers to a single point of interaction between the user and the electrical load control. In the embodiments depicted, the interface element is an actuator. Note that the single interface element presented to the user via the external user interface excludes the possibility of multiple push buttons or receptacle-type connectors being part of the external user interface. Advantageously, the external user interface of the electrical load control is configured substantially with the appearance of any conventional switch, notwithstanding presence of the fault protection device within the housing. As illustrated in FIGS. 9A-9B, the electrical load control may further include a wallplate with an opening exposing at least a portion of the external user interface to allow access to the actuator of the external user interface. In one embodiment, this single opening is the only opening in the wallplate (that is, other than openings for mounting screws to, for example, attach the wallplate). Also, as illustrated in FIG. 2, one side of the actuator (in one embodiment) is labeled “RESET”, and the other side “TEST”, which functions (in part) to inform a user of the presence of the fault protection device within the electrical load control.

In the embodiment of FIG. 2, actuator 211 is a rocker-type actuator. However, other types of actuators, such as a toggle-type actuator, a slide-type actuator, a push-type actuator, an occupancy sensor, or a timer, etc., could alternatively be employed as the single interface element. Actuator 211 interfaces with a support tray 212, which accommodates actuator 211 and facilitates the functionality thereof, as described further below. In the illustrated embodiment, external user interface 210 further includes one or more indicators 205, which are coupled to, for example, the electrical switch assembly or the fault protection device disposed within housing 220 to indicate one or more states of the electrical switch assembly or the fault protection device.

Figure 3:
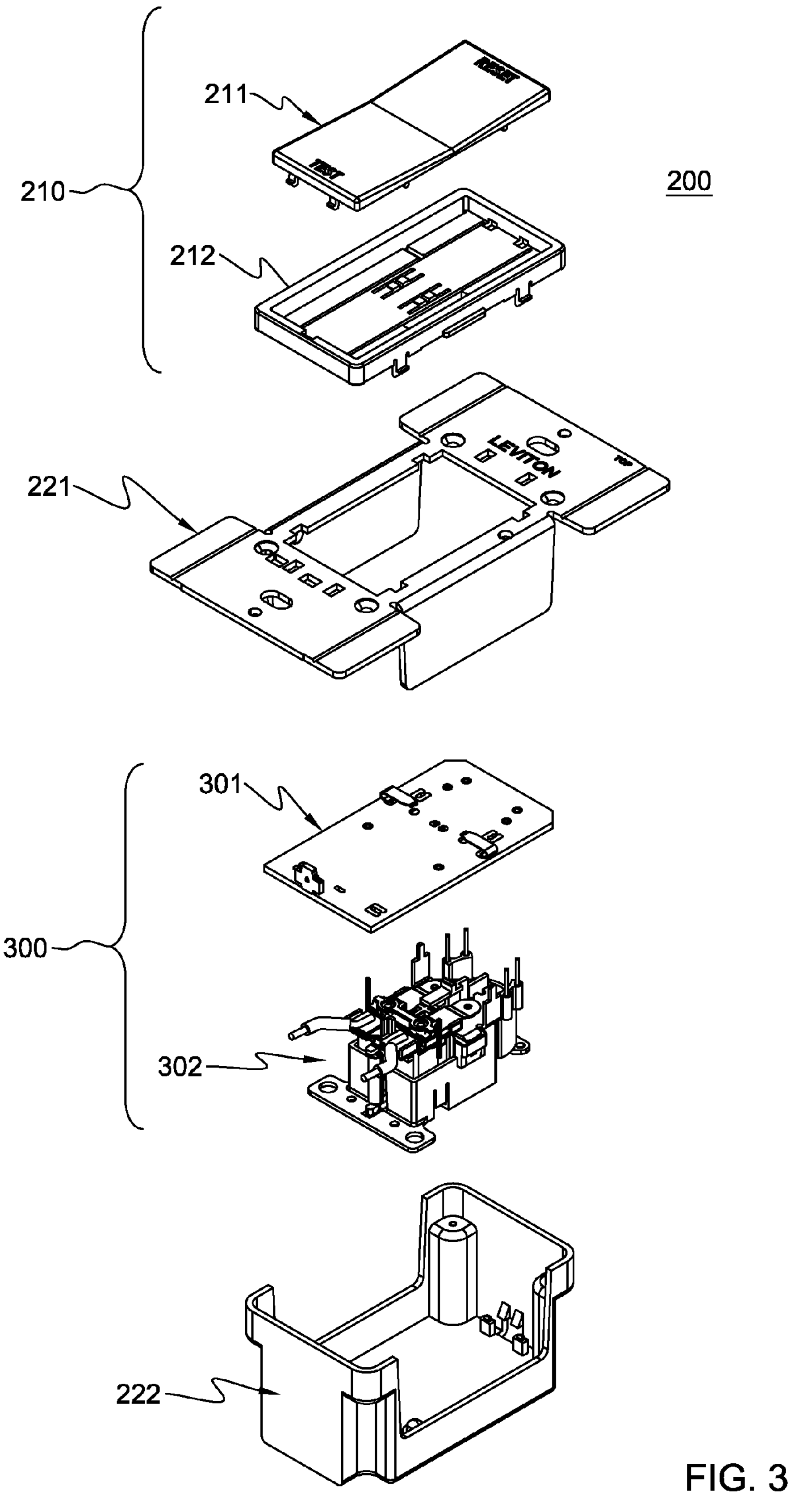
FIG. 3 is a partially exploded view of the electrical load control of FIG. 2, in accordance with one or more aspects of the present invention.

FIG. 3 illustrates a partially exploded view of electrical load control 200 of FIG. 2. In addition to lower housing component 222, upper housing component 221, and external user interface 210 (comprising actuator 211 and support tray 212), electrical load control 200 includes a fault protection device 300, which comprises (in one embodiment) an electronic control board 301 and a module 302, which cooperate to perform the fault protection function of fault protection device 300. In one example, electronic control board 301 and module 302 implement a GFCI device. However, as noted above, a GFCI device is only one example. Alternatively, an AFCI device could be employed within the electrical load control as the fault protection device, or a combined GFCI/AFCI device could be employed. In the implementation description below, it is assumed that the fault protection device is a GFCI device.

One embodiment of a compact ground fault circuit interrupter module, which may be employed as module 302 is described in commonly owned U.S. Pat. No. 7,436,639, the entirety of which is hereby incorporated herein by reference. The module described therein, which is capable of being incorporated into various GFCI devices, employs a double-pole, single-throw (DPST) relay mechanism, a differential transformer and a neutral transformer which, when connected to the electronic circuit board, can reside within a single gang enclosure wall box.

Specifically, in one implementation, the pair of transformers and the double-pole, switch-throw (DPST) relay are mounted as a self-contained assembly for installation as a unit or module. The first transformer has a core and is electrically coupled to a first set of terminals for connection to the electronic circuit board, such as a printed circuit board. The second transformer is located adjacent to and magnetically coupled to the core of the first transformer, and is electrically coupled to a second set of terminals for connection to the electronic control board. The DPST relay has a pair of stationary contacts and a pair of movable contacts for selectively connecting phase and neutral input conductors to the phase and neutral output conductors of the electrical load control. The relay is in one of two states. In a closed state, current is allowed to flow from the input side to the output side of the electrical load control, while in an open state, current does not flow from the input side to the output side. In normal operation, the relay coil is energized. When the GFCI circuitry detects a ground fault condition, the relay coil is de-energized, thereby automatically breaking the connection between the input side and the output side contacts of the relay. The neutral transformer detects a low impedance condition between the output side neutral and a ground conductor, and the differential transformer detects an unbalanced current flowing through the input side phase and neutral conductors. Further details of GFCI devices are provided in the above-incorporated U.S. Pat. Nos. 4,595,894 & 7,436,639.

Figure 4A:
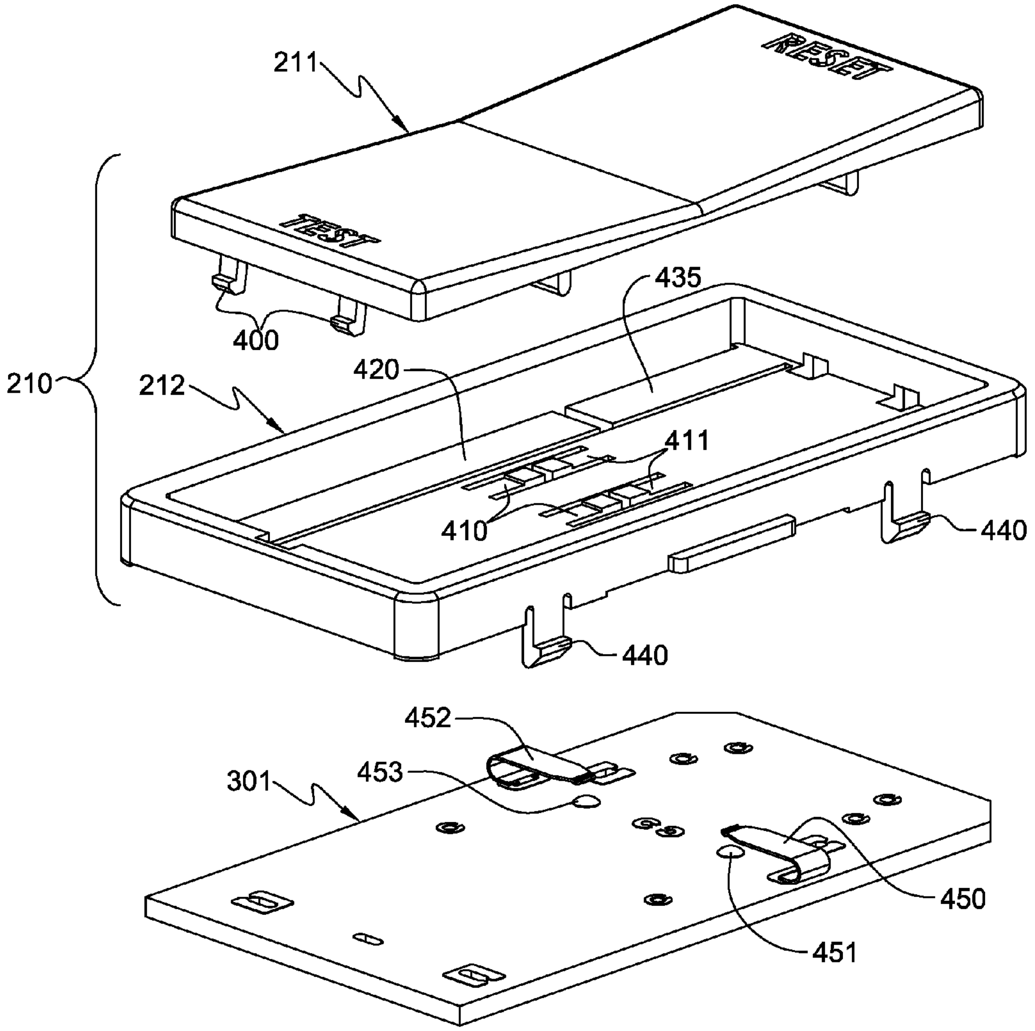
FIG. 4A is a partially exploded, top perspective view of the external user interface and electronic control board of the electrical load control of FIGS. 2 & 3, in accordance with one or more aspects of the present invention.
Figure 4B:
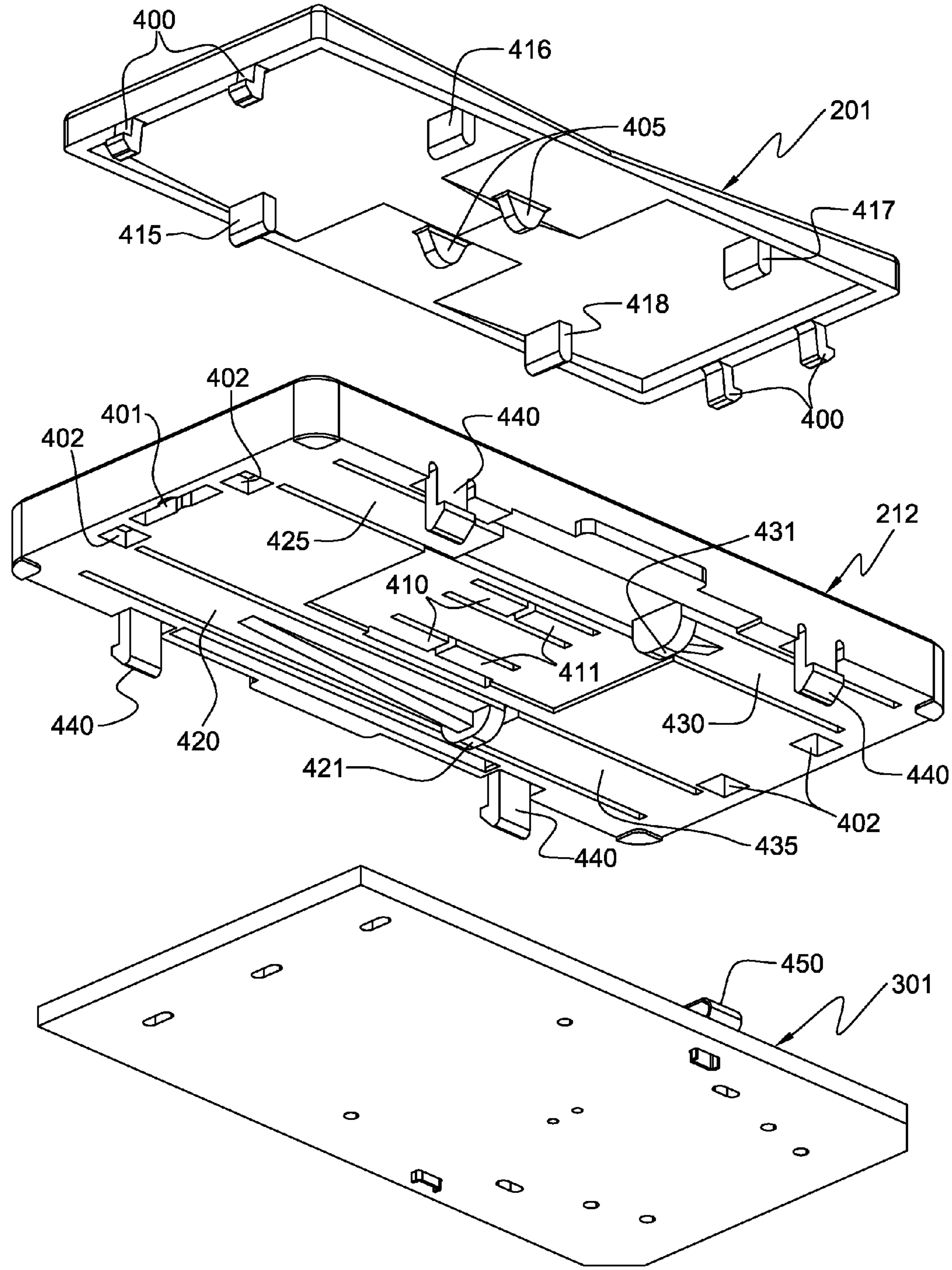
FIG. 4B is a partially exploded, bottom perspective view of the external user interface and electronic control board of FIG. 4A, in accordance with one or more aspects of the present invention.
Figure 5:
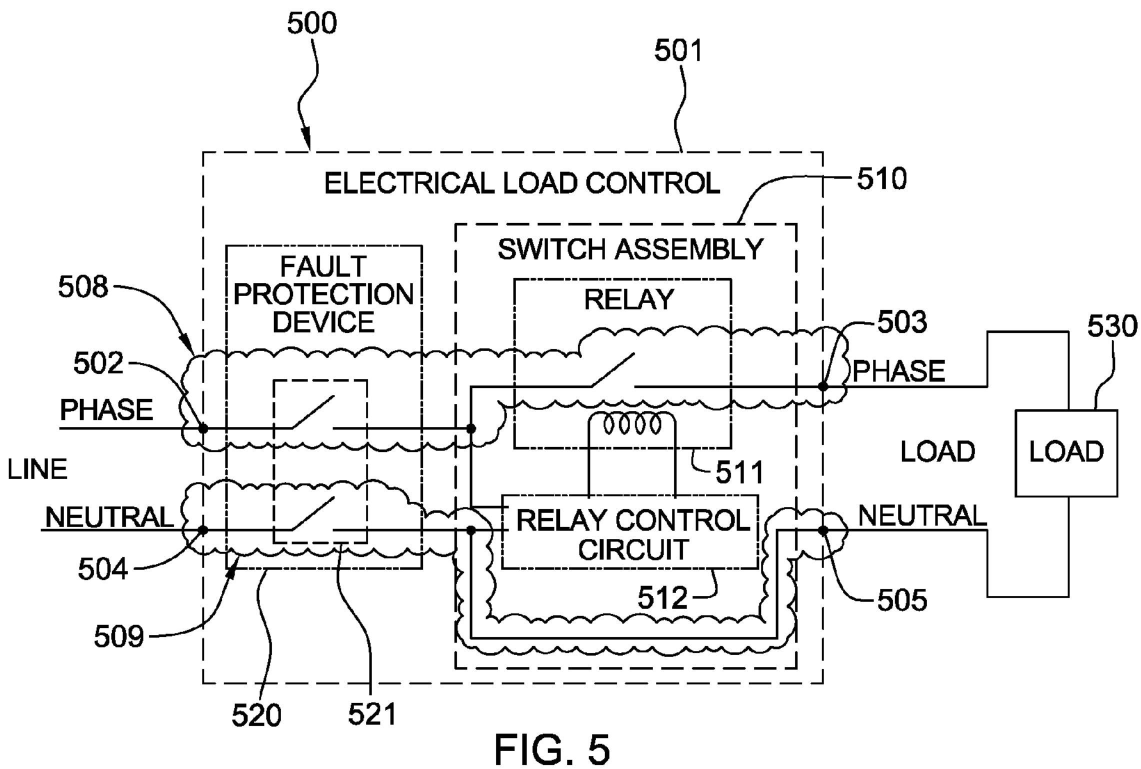
FIG. 5 is a circuit diagram of another embodiment of electrical load control, in accordance with one or more aspects of the present invention.

Referring collectively to FIGS. 4A & 4B, one embodiment of coupling external user interface 210 to electronic control board 301 is described below. In this embodiment, actuator 211 comprises rockers 405 on its underside that are configured and positioned to rest on leaf springs 410, 411 of support tray 212. Retention hooks 400 extend from actuator 211 and are sized to extend through openings 402 in support tray 212. These hooks are of sufficient length to allow for rocking of actuator 211 between a first position and a second position, with the first position being obtained with a user pressing the actuator on the RESET side of the actuator, and the second position being obtained by a user pressing the actuator on the TEST side of the actuator. Pushers 415, 416, 417, 418 extend downward from the underside of actuator 211 and are sized and positioned to engage a respective actuating arm or counterbalance arm of support tray 212.

In particular, a user pressing the RESET side of actuator 211, forces pushers 417, 418 downward, resulting in applying a downward force to actuating arm 430 and counterbalance arm 435, respectively. Actuating arm 430 includes an actuation surface 431, which in turn contacts and applies force to an electrically conductive leaf spring 450 provided on electronic control board 301. By pressing downward electrically conductive leaf spring 450, electrical connection is made to an electrical contact structure 451 on electronic control board 301 to provide a first input signal. The electronic control board is electrically configured such that the first input signal causes the fault detection device to perform the RESET function, thereby switching ON electricity to the load connected to the electrical load control.

Similarly, a user pressing the TEST side of actuator 211, forces pushers 415, 416 downward, resulting in applying a downward force to actuating arm 420 and counterbalance arm 425, respectively. This action results in actuation surface 421 of actuating arm 420 contacting an electrically conductive leaf spring 452 on electronic control board 301 and moving the electrically conductive leaf spring 452 into electrical contact with an electrical contact structure 453 on electronic control board 301 to provide a second input signal. The electronic control board is electrically configured such that the second input signal causes the fault detection device to switch OFF electricity to the load by, for example, issuing a TEST of the fault detection device. For example, this action may involve inducing a TEST fault in the fault protection device, resulting in the fault detection device interrupting electrical connection between one or more of the phase input and output terminals or the neutral input and output terminals of the electrical load control; i.e., selectively interrupting one or more of the phase and neutral conductive paths.

In the implementation of FIGS. 4A & 4B, depending side hooks 440 are provided to releasably couple external user interface 210 to, for example, upper housing component 221 (see FIGS. 2 & 3). By appropriate manipulation of side hooks 440, external user interface 210 could be removed from the housing, for example, to allow access to the electronic control board or module of the fault protection device, or to replace the external user interface with a different external user interface, as desired.

As noted, FIGS. 5-8B depict an alternate implementation of electrical load control, in accordance with aspects of the present invention. In this alternative implementation, the load control includes a single housing, an electrical switch assembly, a fault protection device, and an external user interface. The external user interface includes an interface element, which in accordance with one embodiment of the present invention, comprises the actuator of the electrical switch assembly. Advantageously, the external user interface presents the appearance of any conventional wall switch, notwithstanding provision of automated fault protection within the electrical load control. In the physical implementation of FIGS. 6A-8B, the external user interface is coupled to the housing and movement of the external user interface away from the housing exposes within the housing an internal user interface for the fault protection device. This internal user interface includes a TEST button and a RESET button, which facilitate user control of the fault protection device. Movement of the external user interface relative to the housing is facilitated via an appropriate coupling mechanism for attaching the external user interface to the housing. In the example depicted in FIGS. 6A-8B, the external user interface is hingedly coupled to the housing. However, other attachment mechanisms could be employed, such as, for example, a sliding mechanism, a clip mechanism, or other fastening mechanism.

Referring first to FIG. 5, the circuit embodiment of the electrical load control, generally denoted 500, includes a fault protection device 520 and an electrical switch assembly 510 disposed within a common housing 501. Fault protection device 520 may be, for example, a GFCI device, an AFCI device, a combined GFCI/AFCI device, or other device, such as described above in connection with the embodiment of FIGS. 1-4B. As illustrated, fault protection device 520 is electrically coupled to a phase input terminal 502 and a neutral input terminal 504, which are respectively connected to the phase line conductor and neutral line conductor. Output of fault protection device 520 is coupled to the electrical switch assembly 510, which in this example, comprises a relay 511 and a relay control circuit 512. Relay control circuit 512 is coupled to fault protection device 520 at, for example, the phase and neutral outputs thereof. Alternatively, relay control circuit 512 could couple to the fault protection device at the phase and neutral inputs to the device. In the illustrated embodiment, relay 511 is electrically coupled between fault protection device 520 and a phase output terminal 503 of the electrical load control. Alternatively, relay 511 could be coupled between fault protection device 520 and a neutral output terminal 505. Phase output terminal 503 and neutral output terminal 505 are electrically coupled via phase and neutral load conductors to provide electrical current to a load 530. As shown, a phase conductive path 508 of the electrical load control 500 connects (through fault protection device 520 and switch assembly 510) phase input terminal 502 and phase output terminal 503, and a neutral conductive path 509 connects (again, through fault protection device 520 and switch assembly 510) neutral input terminal 504 and neutral output terminal 505.

In this embodiment of the electrical load control, electrical switch assembly 510 operates independent of fault protection device 520, and fault protection device 520 is configured and electrically connected to respond to a predetermined fault condition by automatically overriding the electrical switch assembly by automatically blocking or interrupting electrical connection between one of more of the phase input terminal and the phase output terminal, or the neutral input terminal and the neutral output terminal (i.e., selectively interrupting one or more of the phase and neutral conductive paths), for example, via a double-pole, single-throw (DPST) relay mechanism, as one example of a relay 521 of fault protection device 520.

Figure 6A:
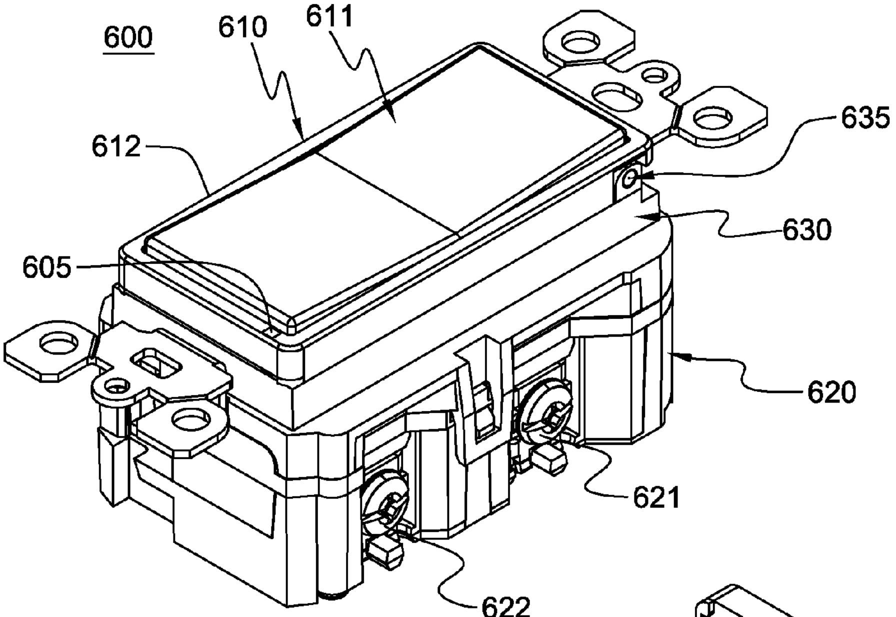
FIG. 6A is a perspective view of one embodiment of the electrical load control of FIG. 5, in accordance with one or more aspects of the present invention.
Figure 6B:
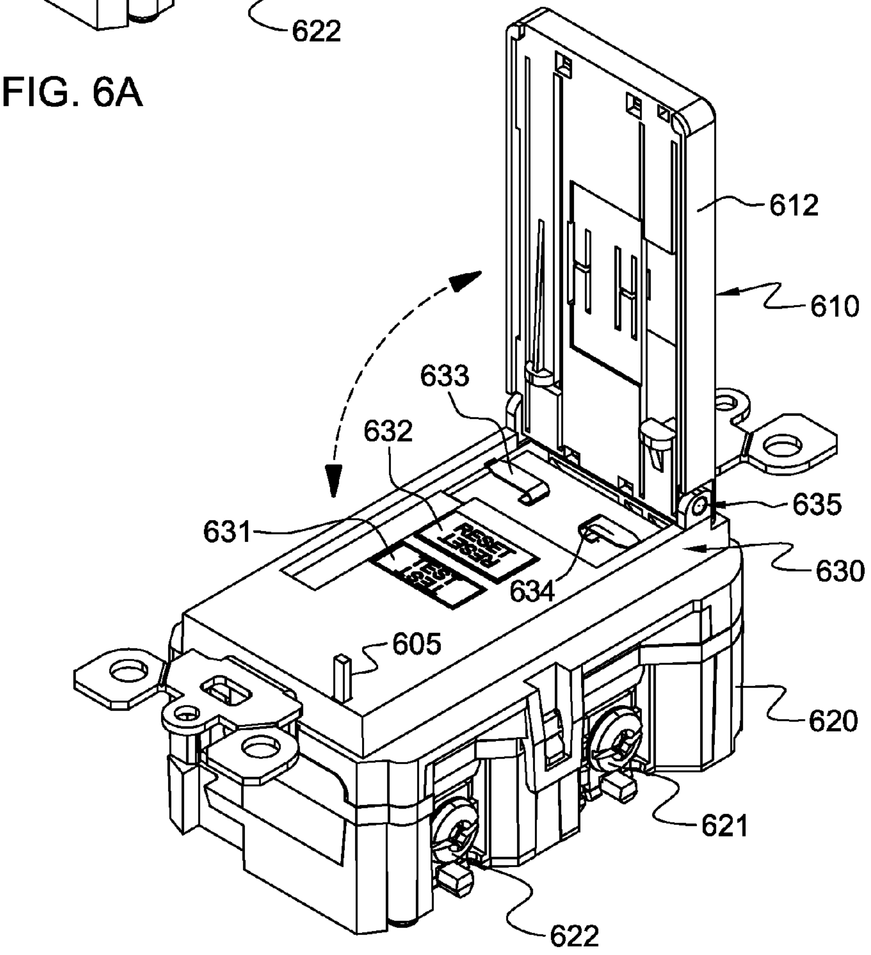
FIG. 6B is a perspective view of the electrical load control of FIG. 6A, shown with the external user interface moved away from the housing to expose an internal user interface for the fault protection device, in accordance with one or more aspects of the present invention.

FIGS. 6A & 6B depict, by way of example, one physical implementation of an electrical load control, generally denoted 600, which implements the load control circuit of FIG. 5. As shown, electrical load control 600 includes an external user interface 610 movably or removably coupled to a housing 620 to allow for movement of external user interface 610 away from housing 620 to expose (within or coupled to the housing) an internal user interface 630 for the fault protection device of the electrical load control. This internal user interface 630 includes a TEST button 631 and RESET button 632, which facilitate user interaction with and control of the fault protection device. In the illustrated implementation, the external user interface 610 is hingedly 635 coupled to internal user interface 630. In an alternate implementation, external user interface 610 could couple directly to housing 620 via an appropriate fastening mechanism.

External user interface 610 advantageously presents to a user a single interface element, which is, in one embodiment, an actuator 611 of the electrical switch assembly, described above in connection with FIG. 5. As noted, a "single interface element" is used herein to refer to a single point of interaction between the user and the electrical load control. In the embodiments described herein the interface element is an actuator. Note that the presence of a single interface element excludes the possibility of multiple push buttons or receptacle-type connectors being included in the external user interface. Advantageously, the external user interface of the electrical load control is configured substantially with the appearance of any conventional switch, notwithstanding presence of a fault protection device within the housing.

In the embodiment of FIGS. 6A & 6B, actuator 611 is a rocker-type actuator. As with the embodiment of FIG. 2, however, other types of actuators, such as a toggle-type actuator, a slide-type actuator, a push-type actuator, an occupancy sensor, a timer, etc., could be employed as the single interface element. In the embodiment depicted, actuator 611 resides in a support tray 612, which is configured to accommodate actuator 611 and facilitate the functionality of the electrical switch assembly, as described further below. In this embodiment, external user interface 610 further includes one or more light indicators 605, which are coupled to, for example, the electrical switch assembly or the fault protection device disposed within housing 620 to indicate one or more states of the electrical switch assembly or the fault protection device. As with the first embodiment, other types of annunciation apparatus could also be employed in place of or in combination with the one or more light indicators. For example, audio means, such as a horn or siren, could be employed to indicate a state of the electrical load control. As indicated above, and partially shown in FIGS. 6A & 6B, the electrical load control 600 includes a phase conductive path connecting (through the fault protection device and the switch assembly) a phase input terminal (not shown), and a phase output terminal 621, as well as a neutral conductive path connecting (again, through the fault protection device and the switch assembly), a neutral input terminal (not shown), and a neutral output terminal 622.

In FIG. 6B, external user interface 610 is moved away from housing 620 via a pivoting movement of the external user interface upwards to expose internal user interface 630. In this embodiment, internal user interface 630 includes TEST button 631 and RESET button 632, which again facilitate user interaction with and control of the fault protection device. Note that, in the depicted embodiment, movement of external user interface 610 away from housing 620 also exposes a first electrically conductive leaf spring 633 and a second electrically conductive leaf spring 634 of the electrical switch assembly. Operation of these structures is described further below with reference to FIGS. 7-8B.

Figure 7:
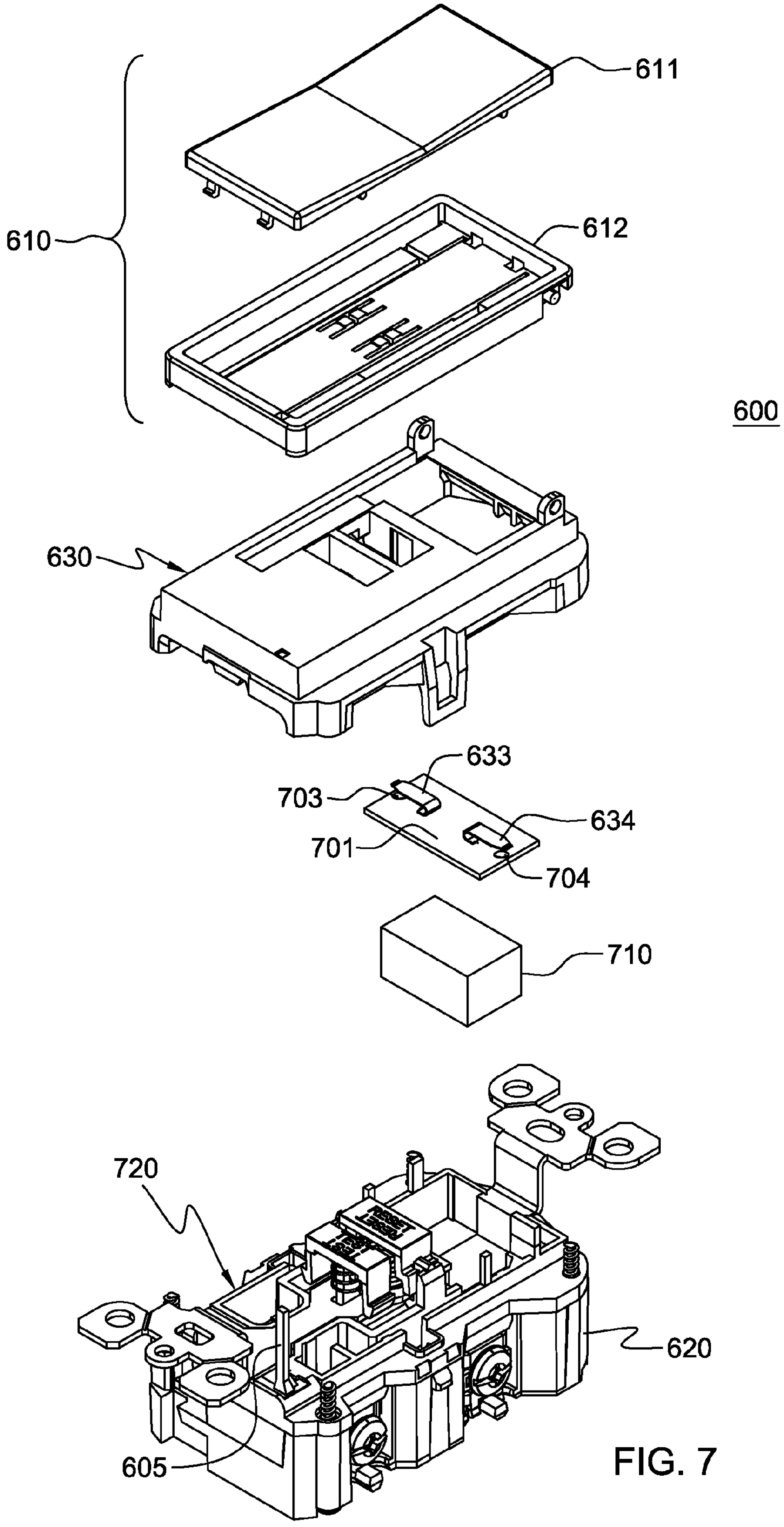
FIG. 7 is a partially exploded view of the electrical load control of FIGS. 6A & 6B, in accordance with one or more aspects of the present invention.

FIG. 7 illustrates a partially exploded view of electrical load control 600 of FIGS. 6A & 6B. In addition to housing 620, internal user interface 630, and external user interface 610 (comprising actuator 611 and support tray 612), electrical load control 600 includes: an electrical switch assembly, which comprises (in one embodiment) electronic control board 701 and a relay 710; and a fault protection device 720. In one embodiment, the electrical switch assembly is configured and electrically connected such that forcing electrically conductive leaf spring 633 into electrical contact with an electrical contact structure 703 of electronic control board 701 switches ON electricity to the load, while forcing electrically conductive leaf spring 634 into electrical contact with an electrical contact structure 704 of electronic circuit control board 701 switches OFF electricity to the load. Actuation of the leaf springs, which is described further below with reference to FIGS. 8A & 8B, controls relay 710. Relay 710 may be any appropriate, commercially available relay, such as a double-pole, single throw, normally open, power relay with a subminiature package that may be through-hole mounted on a printed circuit board with a fully sealed enclosure such as a Model No. G6B-2214P-US relay, offered by Omron Corporation, of Kyoto, Japan.

In one example, fault protection device 720 is a GFCI device, such as that described in commonly assigned PCT Application No. PCT/US2009/049840, published Jan. 14, 2010, as PCT Publication No. WO 2010/005987, the entirety of which is hereby incorporated herein by reference. Fault protection device 720 may be substantially identical to the device depicted and described in this commonly owned PCT application, with a slight modification of internal support structures to accommodate the electrical switch assembly, comprising relay 710 and electronic circuit control board 701 (as illustrated in FIG. 7). Also, as noted above, a GFCI device is only one example of a fault protection device 720 integrated within the housing of the electrical switch assembly. For example, an AFCI device could alternatively be employed, as could a GFCI/AFCI device.

Figure 8A:
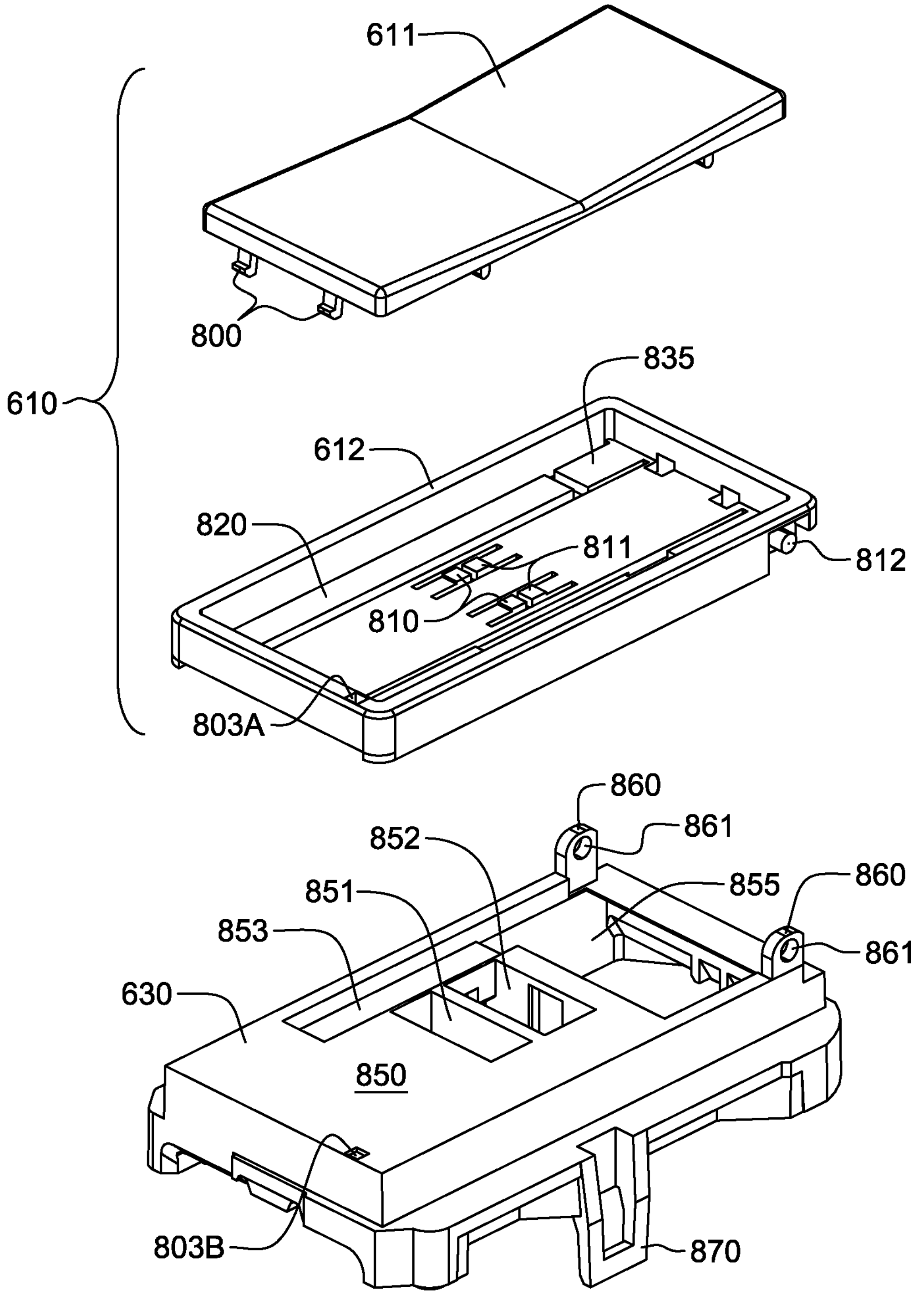
FIG. 8A is a partially exploded, top perspective view of the external user interface and an internal user interface portion of the electrical load control of FIGS. 6A-7, in accordance with one or more aspects of the present invention.
Figure 8B:
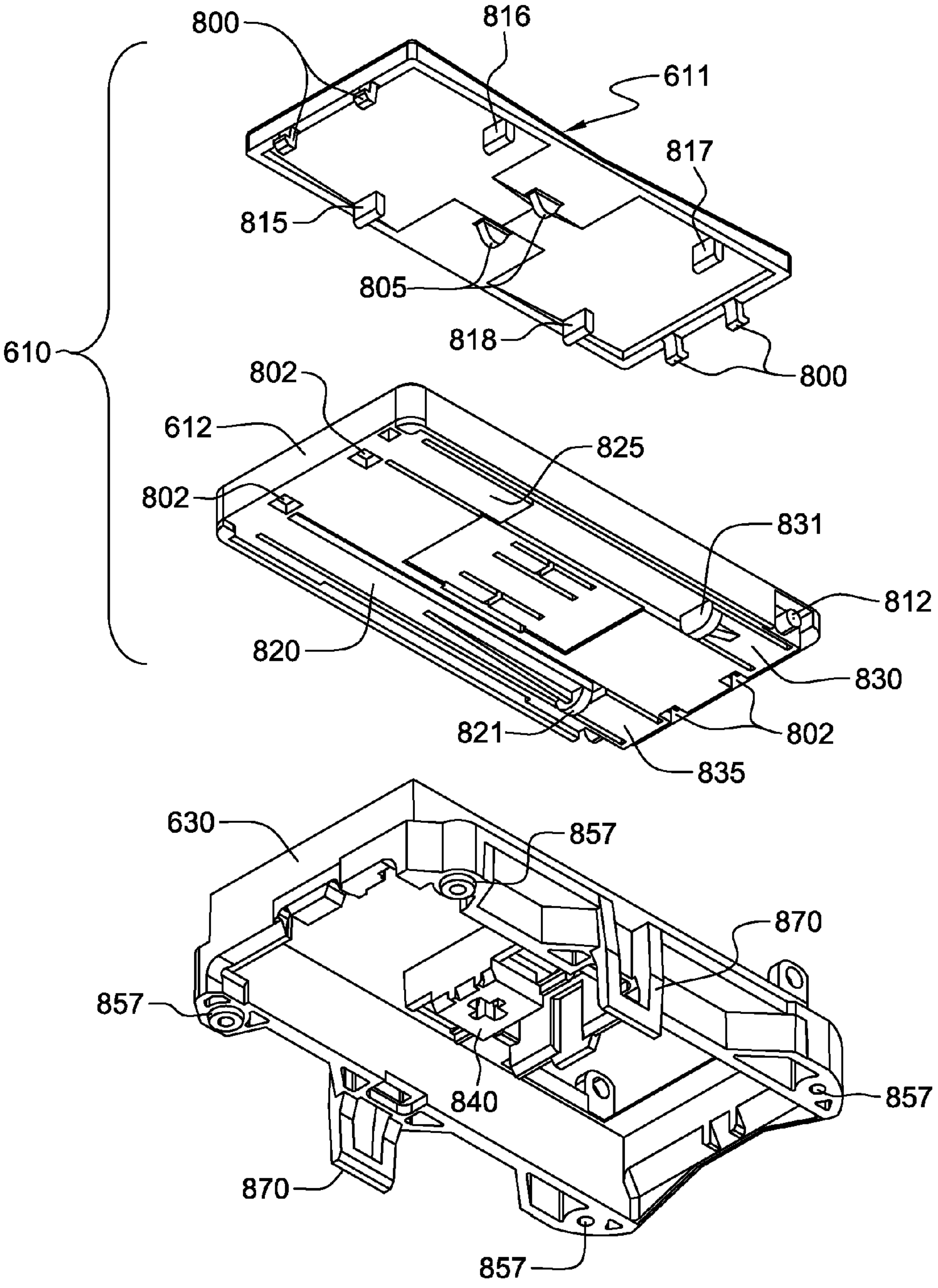
FIG. 8B is a partially exploded, bottom perspective view of the external user interface and internal user interface portion of FIG. 8A, in accordance with an aspect of the present invention.

Referring collectively to FIGS. 8A & 8B, further details of one embodiment of external user interface 610 and internal user interface 630 are provided. Note that, in these exploded views, the TEST and RESET buttons of internal user interface 630 (and fault protection device 720 (see FIG. 7)) are not illustrated, but would be user-actuatable through appropriately sized and positioned openings 851, 852, respectively. In this implementation, actuator 611 comprises rockers 805 on its underside that are configured and positioned to rest on leaf springs 810, 811 of support tray 612. Retention hooks 800 depend from actuator 611 and are sized to extend through openings 802 in support tray 612. These hooks are of sufficient length to allow for rocking of actuator 611 between a first position and a second position, with the first position being obtained with a user pressing the actuator on a first end thereof, and the second position being obtained by a user pressing the actuator on the second end thereof. Pushers 815, 816, 817 & 818 extend downward from the underside of actuator 611 and are sized and positioned to engage a respective actuating arm or counterbalance arm of the support tray 612.

In particular, a user pressing a first end of the actuator 611 forces (for example) pushers 815, 816 downwards, thereby applying a downward force to actuating arm 820, and counterbalance arm 825, respectively. Actuating arm 820 includes an actuation surface 821, which in turn contacts electrically conductive leaf spring 633 (see FIGS. 6B & 7) provided on electronic control board 701 (FIG. 7) of the electrical switch assembly 700. By forcing electrically conductive leaf spring 633 (see FIG. 7) towards the electronic control board, electrical connection is made to an electrical contact structure 703 on electronic control board. This action instructs the electrical switch assembly to, for example, switch OFF electricity to the load connected to the electrical load control. Similarly, a user pressing the other end of actuator 611, forces pushers 817, 818 downward, resulting in applying a downward force to actuating arm 830 and counterbalance arm 835, respectively. This action results in actuation surface 831 of actuating arm 830 contacting electrically conductive leaf spring 634 (see FIG. 7) of electronic control board 701 to move the electrically conductive leaf spring 634 into electrical contact with electrical contact structure 704 on the electronic control board. This action in turn instructs the electrical switch assembly to switch ON electricity to the load.

In the implementation of FIGS. 8A & 8B, trunnions 812 are provided, sized to reside within openings 861 of hinge structures 860 extending upwards from the face plate 850 of internal user interface 630. Note that this hinged coupling of external user interface 610 to internal user interface 630, and hence, to housing 620 (see FIG. 7) is provided by way of example only. Other attachment mechanisms could be employed to facilitate movement or removal of external user interface 610 from the housing, for example, to expose the internal user interface. In the embodiment illustrated, internal user interface 630 further includes a relief 853 to accommodate actuation of actuating arm 820 of the external user interface, and an opening 855 to allow access to the electrically conductive leaf springs of the electronic control board of the electrical switch assembly. Openings 803A, 803B are also provided for the one or more light indicators coupled to the electrical switch assembly or the fault protection device. In the embodiment shown, internal user interface 630 is a capping structure configured to cover housing 620 (see FIG. 7). In one embodiment, internal user interface 630 couples to housing 620 via multiple subassembly snaps 870. Multiple securing members 857 may also be employed to facilitate locking the internal user interface 630 to housing 620.

FIG. 9A depicts, by way of example, the electrical load control 200 of FIGS. 2-4B, with a decorative wallplate 900 mounted thereto. Wallplate 900 includes openings 901 for securing wallplate 900, for example, via appropriate mounting screws. As shown, a single device opening 910 is provided in wallplate 900 to allow user access to external user interface 210 (comprising exposed surface 213 (see FIG. 2) of the housing of load control 200), which comprises actuator 211. In the embodiment of FIG. 9A, external user interface 210 is slightly raised from wallplate 900. The device opening in the wallplate can alternatively be of any suitable size/configuration now known or hereafter used in the art, such as an opening to accommodate a decorator-style duplex, a toggle actuator, a rocker actuator, a paddle actuator, a push-button, a slider, etc., or any combination thereof. Any such wallplate may be referred to as a decorative wallplate, where the term decorative is not limited to any particular style of wallplate. Rather, the term decorative is meant to indicate that the wallplate gives the installation of the device a finished look, as should be readily appreciated by those in the art.

FIG. 9B depicts an alternate implementation of the electrical load control 200 of FIGS. 2-4B, wherein the actuator 920 is a toggle-type actuator, and a single opening 910' is provided in wallplate 900, configured to allow user-actuation of actuator 920 of electrical load control 200'. In most other aspects, electrical load control 200' is analogous to electrical load control 200, described above in connection with FIGS. 2-4B.

Those skilled in the art should note that the electrical load control 600 of FIGS. 6-8B could also be combined with a wallplate, such as depicted in FIGS. 9A-9B. In such a configuration, a user might remove the wallplate prior to moving or removing the external user interface to expose the internal user interface, as desired. Alternatively, the opening in the wallplate might be configured to allow for movement of the external user interface away from the housing, without removing the wallplate from the assembly.

As can be appreciated, multiple detection modes for certain predetermined faults are anticipated for a fault protection device within an electrical load control, in accordance with an aspect of the present invention. For instance, GFCI devices generally protect against ground current imbalances. They generally protect against ground and neutrals by using two sensing transformers in order to trip the device when a grounded neutral fault occurs. As can be appreciated, a GFCI may also protect against open neutrals. An open neutral can be protected against by utilizing a constant duty relay solenoid switch, powered across the phase and neutral of the line. The GFCI device may also protect against reversed wiring. Further, it may be desirable to provide an indication of a reverse wiring condition, even if the device is tripped and "safe". Such an indication may relieve user frustration in ascertaining a problem.

The circuit-interrupting and RESET portions of the fault protection devices discussed herein may use electro-mechanical components to break (open) and make (close) one or more conductive paths between the line and load sides of the device. However, electrical components, such as solid state switches and supporting circuitry, may be used to open and close the conductive paths. Generally, the circuit-interrupting portion of the fault protection device is used to automatically break electrical continuity in one or more conductive paths (i.e., open the conductive path) between the line and load sides upon the detection of a fault, which in one embodiment is a ground fault. The RESET portion is used to close the open conductive paths. In further embodiments, a RESET lockout may be employed. In such embodiments, the RESET portion is used to disable the RESET lockout, in addition to closing the open conductive paths. In this configuration, the operation of the RESET and RESET lockout portions is in conjunction with the operation of the circuit-interrupting portion, so that electrical continuity in open conductive paths cannot be RESET if the circuit-interrupting portion is non-operational, if an open neutral condition exists, and/or if the device is reverse wired. In the embodiments including an independent trip portion, electrical continuity in one or more conductive paths can be broken independently of the operation of the circuit-interrupting portion. Thus, in the event that the circuit-interrupting portion is not operating properly, the device can still be tripped.

In the fault protection device embodiments described, the TEST facility tests the operation of the circuit-interrupting portion (or circuit interrupter) disposed within the device. The circuit-interrupting portion is used to break electrical continuity in one or more conductive paths between the line and load sides of the fault protection device. The RESET facility reestablishes electrical continuity in the open conductive paths.

Although shown as electromechanical components used during circuit-interrupting and RESET operations, semiconductor-type circuit-interrupting and RESET components may alternatively be employed, as well as other mechanisms capable of making and breaking electrical continuity.

Advantageously, disclosed herein are various electrical load controls comprising a housing, an electrical switch assembly, a fault protection device, and an external user interface. The external user interface comprises a single interface element which (in one embodiment) is the actuator of the electrical switch assembly. Advantageously, the external user interface is configured with the appearance of any conventional switch, notwithstanding presence of the fault protection device within the housing.

This is accomplished, in one embodiment, by coupling the electrical switch assembly to the fault protection device so that the single actuator switches ON or OFF electricity to the load via control of the fault protection device. Notwithstanding the switching, the fault protection device is independent of the electrical switch assembly, and responds to one or more predetermined fault conditions by automatically overriding the electrical switch assembly by automatically blocking electrical connection between one or more of the phase input and output terminals, or the neutral input and output terminals; i.e., selectively interrupting one or more of the phase and neutral conductive paths.

In another embodiment, the external user interface is movably or removably coupled to the housing, so that movement of the external user interface away from the housing exposes an internal user interface for the fault protection device. This internal user interface may comprise a conventional TEST button and RESET button, which facilitate user interaction with the fault protection device.

Advantageously, the electrical load controls disclosed herein provide fault protection, while visually integrating with other existing switching devices with an easy-to-use interface. The electrical load control disclosed herein can adapt to many different configuration platforms, and be employed in a variety of applications. Aside from the optional presence of one or more light indicators, only a single actuator may be exposed on the face of the electrical load control, that is, on the external user interface. The disclosed electrical load controls also integrate well into existing NEMA-specified, single-gang enclosures. The disclosed electrical load controls also advantageously eliminate the need for either a combined switch and receptacle device or the need to electrically wire a conventional switch in electrical contact with a conventional receptacle-style fault protection device in order to achieve fault protection, for example, on a bathroom circuit, bedroom circuit, or exterior circuit.

Still further, existing fault protection features, such as end-of-life protection, self test, audible/visual notification, reverse wire protection, etc., may be integrated within an electrical load control such as disclosed herein. Further details on end-of-life protection and reverse wire protection are provided in commonly owned, U.S. Pat. No. 7,463,124, on self-test of fault protection devices are provided in commonly owned PCT Publication No. WO 2009/097469, and on notification techniques are provided in commonly owned, U.S. Pat. No. 6,437,700, the entirety of each of which is hereby incorporated herein by reference. Further details on GFCI devices are provided in the above-incorporated, commonly owned, U.S. Pat. Nos. 6,040,967, and 7,463,124, and further details on AFCI devices are provided in the above-incorporated, commonly owned U.S. Pat. Nos. 7,003,435, and 7,535,234.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. An electrical load control comprising:

a housing, wherein the housing does not include a receptacle socket for receiving one or more blades of a plug;

a phase conductive path comprising a phase input terminal and a phase output terminal;

a neutral conductive path comprising a neutral input terminal and a neutral output terminal;

wherein each of the phase and neutral conductive paths is at least partially disposed within the housing, the phase and neutral conductive paths being arranged and configured to connect a source of electricity, connected to the phase and neutral input terminals, to a load connected to the phase and neutral output terminals;

a selectively operable electrical switch assembly disposed at least partially within the housing, the electrical switch assembly comprising a single-user-manipulated switch actuator and being arranged and configured to selectively interrupt at least one of the phase or neutral conductive paths to control connection of the source of electricity to the load responsive to user manipulation of the single user-manipulated switch actuator;

a fault protection device disposed at least partially within the housing, the fault protection device being adapted and configured to control operation of the electrical switch assembly in response to a predetermined fault condition; and wherein actuation of the single-user-manipulated switch actuator operatively controls connection of the source of electricity to the load via the fault protection device by selectively inducing a simulated fault in the fault protection device, and wherein at least a portion of the single-user-manipulated switch actuator extends beyond the housing and is sized and configured to occupy a substantial portion of a single opening in a decorative wallplate.

2. The electrical load control of claim 1, wherein the single-user-manipulated switch actuator of the electrical switch assembly is operably coupled to a double-pole, single-throw (DPST) switch of the fault protection device.

3. The electrical load control of claim 2, wherein the DPST switch is electrically coupled between the input and output terminals of at least one of the phase or neutral conductive paths.

4. The electrical load control of claim 1, wherein the single-user-manipulated switch actuator of the electrical switch assembly comprises a first actuated state which initiates a RESET of the fault protection device, and a second actuated state which initiates a TEST of the fault protection device.

5. The electrical load control of claim 1, further comprising an indicator, the indicator being adapted and configured to indicate a state of at least one of the electrical switch assembly or the fault protection device.

6. The electrical load control of claim 1, wherein the fault protection device comprises at least one of a ground fault circuit interrupter (GFCI) or an arc fault circuit interrupter (AFCI).

7. The electrical load control of claim 1, wherein the electrical switch assembly comprises a support tray arranged and configured to accommodate the single-user-manipulated switch actuator, and wherein the fault protection device further comprises a circuit board comprising a controllable electric contact, wherein the support tray comprises at least one actuating arm responsive to user manipulation of the single-user-manipulated switch actuator, the at least one actuating arm closing or opening the at least one controllable electrical contact in response to user manipulation of the single-user-manipulated switch actuator to selectively connect the source of electricity to the load.

8. The electrical load control of claim 1, wherein the single-user-manipulated switch actuator of the electrical switching assembly is one of a rocker-type actuator, a toggle-type actuator, a slide-type actuator, a touch-type actuator, or a motion sensing-type actuator.

9. An electrical load control comprising:

a housing, wherein the housing does not include a receptacle socket for receiving one or more blades of a plug;

a phase conductive path having a phase input terminal and a phase output terminal;

a neutral conductive path having a neutral input terminal and a neutral output terminal;

wherein each of the phase and neutral conductive paths is at least partially disposed within the housing, the phase and neutral conductive paths being arranged and configured to connect a source of electricity, connected to the phase and neutral input terminals, to a load connected to the phase and neutral output terminals;

a selectively operable electrical switch assembly disposed at least partially within the housing, the electrical switch assembly comprising an external user-manipulated switch actuator and being arranged and configured to selectively interrupt at least one of the phase or neutral conductive paths to control connection of the source of electricity to the load responsive to user manipulation of the external user-manipulated switch actuator;

a fault protection device disposed at least partially within the housing, the fault protection device being adapted and configured to control operation of the electrical switch assembly in response to a predetermined fault condition; and wherein the external user-manipulated switch actuator is coupled to the housing and configured for movement away from the housing to expose an internal user interface of the fault protection device, the internal user interface comprising a TEST button and a RESET button which facilitate user interaction with the fault protection device.

10. The electrical load control of claim 9, wherein the external user-manipulated switch actuator is movably or removably coupled to the housing.

11. The electrical load control of claim 9, wherein the fault protection device is electrically connected to the phase input terminal and the neutral input terminal, and the electrical switch assembly is electrically connected between the fault protection device and at least one of the phase output terminal or the neutral output terminal.

12. The electrical load control of claim 11, wherein the electrical switch assembly further comprises a relay and a relay controller, the relay controller being electrically coupled to the fault protection device, and wherein the relay is electrically connected between the fault protection device and at least one of the phase output terminal or the neutral output terminal.

13. The electrical load control of claim 9, further comprising an indicator, the indicator being adapted and configured to indicate a state of at least one of the electrical switch assembly or the fault protection device.

14. The electrical load control of claim 9, wherein the fault protection device comprises at least one of a ground fault circuit interrupter (GFCI) or an arc fault circuit interrupter (AFCI).

15. The electrical load control of claim 9, wherein the electrical switch assembly further comprises a support tray arranged and configured to accommodate the external user-manipulated switch actuator, and wherein the fault protection device further comprises a circuit board comprising a controllable electric contact, wherein the support tray comprises at least one actuating arm responsive to user manipulation of the external user-manipulated switch actuator, the at least one actuating arm closing or opening the at least one controllable electrical contact in response to manipulation of the external user-manipulated switch actuator to selectively connect the source of electricity to the load.

16. The electrical load of claim 9, wherein the external user-manipulated switch actuator covers, in part, the internal user interface of the fault protection device in a first position, and exposes the internal user interface of the fault protection device in a second position.

* * * * *